United States Patent
Saha et al.

(10) Patent No.: US 8,374,328 B2
(45) Date of Patent: Feb. 12, 2013

(54) METHOD AND SYSTEM FOR ADDING A CALLER IN A BLOCKED LIST

(75) Inventors: Subir Saha, Bangalore (IN); Ranjit Avasarala, Bangalore (IN); Samir Dilipkumar Saklikar, Mumbai (IN)

(73) Assignee: Motorola Mobility LLC, Libertyville, IL (US)

( * ) Notice: Subject to any disclaimer, the term of this patent is extended or adjusted under 35 U.S.C. 154(b) by 347 days.

(21) Appl. No.: 12/739,759

(22) PCT Filed: Nov. 11, 2008

(86) PCT No.: PCT/US2008/083095
§ 371 (c)(1),
(2), (4) Date: Apr. 26, 2010

(87) PCT Pub. No.: WO2009/067356
PCT Pub. Date: May 28, 2009

(65) Prior Publication Data
US 2010/0246795 A1    Sep. 30, 2010

(30) Foreign Application Priority Data
Nov. 22, 2007  (IN) .......................... 2445/DEL/2007

(51) Int. Cl.
*H04M 3/42* (2006.01)
(52) U.S. Cl. ......... 379/210.02; 379/142.02; 379/142.03; 379/142.04; 379/142.05; 379/142.06
(58) Field of Classification Search ............. 379/212.02, 379/142.05
See application file for complete search history.

(56) References Cited

U.S. PATENT DOCUMENTS

| | | | |
|---|---|---|---|
| 2003/0021403 A1* | 1/2003 | Jones | 379/210.02 |
| 2004/0076139 A1* | 4/2004 | Kang-Yeh et al. | 370/349 |
| 2006/0182029 A1* | 8/2006 | Kealy et al. | 370/230 |
| 2006/0288076 A1 | 12/2006 | Cowings et al. | |
| 2007/0127631 A1* | 6/2007 | Difiglia | 379/67.1 |
| 2007/0143422 A1* | 6/2007 | Cai | 709/206 |
| 2008/0181380 A1* | 7/2008 | Gustave et al. | 379/142.05 |
| 2009/0310759 A1 | 12/2009 | Andrassy et al. | |

FOREIGN PATENT DOCUMENTS

| | | |
|---|---|---|
| EP | 1691538 A1 | 8/2006 |
| KR | 1019990058498 A | 7/1999 |
| KR | 1020050096432 A | 10/2005 |
| KR | 1020050112142 A | 11/2005 |
| WO | 2007131899 A1 | 11/2007 |

OTHER PUBLICATIONS

Extended European Search Report, Munich, Mar. 19, 2012, all pages.

* cited by examiner

*Primary Examiner* — Joseph J Nguyen (57) ABSTRACT

A method and system for adding a caller (102) in a blocked list is provided. The blocked list is stored at a communication server (104). The method includes receiving (604) a call from the caller (102) at a communication device (108). Further, the method includes receiving (606) a set of inputs at the communication device (108) in response to the call. The set of inputs includes a set of instructions to add the caller (102) in the blocked list. Furthermore, the method includes transmitting (608) a call termination request to the communication server (104). The call termination request includes the set of instructions to add the caller (102) in the blocked list. Transmission of the call termination request initiates addition of the caller (102) in the blocked list at the communication server (104).

4 Claims, 9 Drawing Sheets

METHOD AND SYSTEM FOR ADDING A CALLER IN A BLOCKED LIST

FIELD OF THE INVENTION

This invention relates in general to communication devices, and more specifically, to a method and system for adding a caller in a blocked list.

BACKGROUND OF THE INVENTION

With an increase in the penetration of communication devices in our lives, such as mobile phones, fixed lines in office, and a wireless in local loop phone at home, the number of incoming calls at the communication device have increased disproportionately. Some of these incoming calls are more nuisance than utility for a user of a communication device. Depending on the timing and occasion of the call, a nuisance call can be a call from a persistent telemarketer, a missed call, a wrong number call, an intimidating call, an irksome call, or even an obscene call. Incoming calls of such nature can affect the peace and harmony in the life of the user using the communication device.

There exist various methods that enable the user to avoid such nuisance calls. In one such method, the user can switch-off the communication device for a definite period of time. However, resorting to such a method ensures that all the incoming calls are blocked, even desired and important incoming calls. This decreases the overall utility of the communication device. Another method to avoid the nuisance calls is use of calling number identification (CNID). CNID ensures that the phone number of the caller is displayed on a display screen of the user's communication device. This enables the user to accept the incoming call only from a caller that the user wants to communicate with. This method is only partially effective as the user might have to cancel or consciously avoid a recurring incoming call. This requires a manual effort and a consistent shift in attention from the ongoing business at hand. Moreover, in case the caller uses different lines to call the user, the user will have to keep track of various phone numbers that the user wants to avoid. This makes the method very cumbersome and unfriendly.

In yet another method, a blocked list is maintained at a communication server. The communication server is part of a communication network providing service to the user. The communication server screens and blocks the incoming calls as per the entries listed in the blocked list. For example, the blocked list may contain a number of a notorious telemarketer and if a call is received at the communication server from the same number, the call will be blocked. However, this method would fail in the event that the notorious telemarketer changes lines for making calls until the blocked list is manually updated.

In still another method, a white list is maintained at the communication server. In this case, the communication server allows only incoming calls from entries listed in the white list. For example, the white list will contain the phone numbers approved by the user and whenever a call is received at the communication server from one of those numbers, it will be allowed. However, this method has a disadvantage that it allows only those incoming calls from entries that are listed in the white list and blocks all other incoming calls. Further, even if a combination of the blocked list and the white list is used, it still requires the user to manually update both the blocked list and the white list to ensure accuracy.

None of the above mentioned methods are automated and all involve human intervention. Furthermore, the user is not notified about rejection of a call from a caller in any of these methods.

BRIEF DESCRIPTION OF DRAWINGS

The accompanying figures, where like reference numerals refer to identical or functionally similar elements throughout the separate views, and which, together with the detailed description below, are incorporated in and form part of the specification, serve to further illustrate various embodiments and explain various principles and advantages, all in accordance with the present invention.

Skilled artisans will appreciate that elements in the figures are illustrated for simplicity and clarity and have not necessarily been drawn to scale. For example, the dimensions of some of the elements in the figures may be exaggerated, relative to other elements, to help in improving an understanding of the embodiments of the present invention.

DETAILED DESCRIPTION

For one embodiment, a method for adding a caller in a blocked list is provided. The blocked list is stored at a communication server. The method includes receiving a call from the caller. Further, the method includes receiving a set of inputs at the communication device in response to the call. The set of inputs includes a set of instructions to add the caller in the blocked list. Furthermore, the method includes transmitting a call termination request to the communication server. The call termination request includes the set of instructions to add the caller in the blocked list. Transmission of the call termination request initiates addition of the caller in the blocked list at the communication server.

For another embodiment, a method for adding a caller in a blocked list is provided. The method includes receiving a voice signal from the caller. Further, the method includes comparing a data associated with the voice signal received from the caller with a predefined data. Furthermore, the method includes, based on the comparison, adding the caller in the blocked list when the data associated with the voice signal is comparable to the predefined data.

For yet another embodiment, a method for generating one or more notification alerts for a communication identifier based on rejection of one or more call set-up requests for the communication identifier is provided. The communication identifier is associated with a communication device. The method at a notification server includes receiving a set of instructions from the communication device. Further, the method includes receiving an indication of rejection of the one or more call set-up requests for the communication identifier. Furthermore, the method includes generating the one or more notification alerts based on the set of instructions received from the communication device.

For yet another embodiment, a communication network device is provided. The communication network device includes a receiver configured to receive a voice signal from a caller. Further, the communication network device includes a processor configured to compare a data associated with the voice signal received from the caller with a predefined data. The processor is also configured to add the caller in a blocked list based on the comparison between data associated with the voice signal received from the caller with a predefined data, and when the data associated with the voice signal is comparable to the predefined data Before describing in detail the particular method and system for adding a caller in a blocked list, in accordance with various embodiments of the present invention, it should be observed that the present invention utilizes a combination of method steps and apparatus components that are related to the method and system for adding a caller in a blocked list. Accordingly, the apparatus components and method steps have been represented, where appropriate, by conventional symbols in the drawings, showing only those specific details that are pertinent for an understanding of the present invention, so as not to obscure the disclosure with details that will be readily apparent to those with ordinary skill in the art, having the benefit of the description herein.

In this document, the terms 'comprises,' 'comprising,' 'includes,' 'including,' or any other variation thereof, are intended to cover a non-exclusive inclusion, such that a process, article, system or apparatus that comprises a list of elements does not include only those elements but may include other elements not expressly listed or inherent to such process, article or apparatus. An element preceded by 'comprises . . . a' does not, without more constraints, preclude the existence of additional identical elements in the process, article, system or apparatus that comprises the element. The terms 'includes' and/or 'having', as used herein, are defined as comprising. The term 'another,' as used in this document, is defined as at least a second or more. The term 'includes,' as used herein, is defined as comprising.

Figure 1:
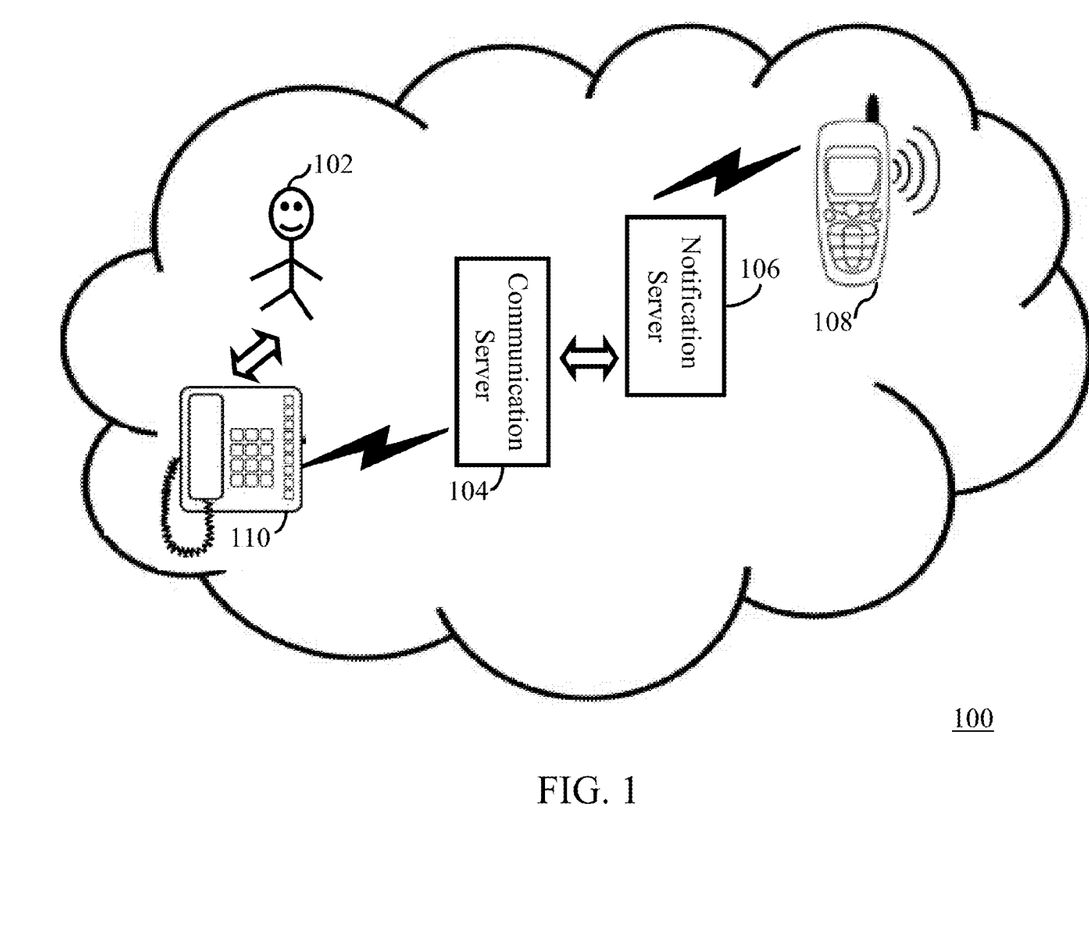
FIG. 1 illustrates an exemplary environment, where various embodiments of the present invention can be practiced.

FIG. 1 illustrates an exemplary communication network 100, where various embodiments of the present invention can be practiced. The communication network 100 can be used for exchange of information and data between different communication devices in the communication network 100. Examples of the communication network 100 can include, but are not limited to, Internet Protocol Multimedia Subsystem (IMS) networks, IEEE 802.16-based broadband wireless access networks, Advanced Mobile Phone Systems (AMPS) networks, Global System for Mobile Communications (GSM) networks, Digital Cellular Systems (DCS) networks, Code Division Multiple Access (CDMA) networks, Integrated Digital Enhanced Network (iDEN), and Universal Mobile Telecommunication Systems (UMTS) networks.

The communication network 100 includes entities such as a caller 102, a communication server 104, a notification server 106, and communication devices 108 and 110. The caller 102 can communicate with a user of any communication device, for example, a user of communication device 108, in the communication network 100 through the communication device 110. In order to communicate with the user of the communication device 108, the caller 102 requests the communication server 104 to establish a call between the communication device 110 and the communication device 108. The communication server 104 enables the communication device 110 and the communication device 108 to communicate between themselves and has capabilities of establishing and handling various types of calls, such as voice calls, data calls and the like. Further, the communication server 104 can host and execute other services such as Voice Call Continuity (VCC) service, Short Message Service (SMS), Multimedia Message Service (MMS), location-based service, voice mail service, and Push-To-Talk (PTT) service among others. The examples of the communication server 104 can be a radio network controller (RNC), servers used for packet termination and routing, and the like.

In a usual scenario, upon receiving the request to establish the call between communication device 110 and the communication device 108, the communication server 104 establishes the call between the communication device 110 and the communication device 108. As a result, the caller 102 and the user of the communication device 108 can communicate with each other. However, in many scenarios the caller 102 can be a telemarketer, a harasser, a malicious caller or any other unwanted caller. In such scenarios, the user of the communication device 108 can terminate the call by pressing a key on the communication device 108 for terminating the call at the communication device 108. As soon as the user presses the key, a call termination request is sent to the communication server 104. In one embodiment, the call termination request can also include a set of instructions to block the caller 102. Based on the set of instructions, the caller 102 is added to a blocked list. The blocked list contains a list of communication identifiers associated with the callers blocked by the user of the communication device 108. For example, the blocked list can contain contact numbers or contact URI (Universal Resource Identifier) associated with the blocked callers.

After the caller 102 has been added to the blocked list, when the caller 102 tries to contact the user of the communication device 110 again, then the communication server 104 can reject the call set-up request from the caller 102 based on the set of instructions. Further, a notification alert regarding rejection of the call set-up request is also sent to the communication device 108. The notification alert is generated by the notification server 106, which works in tandem with the communication server 104 to generate the notification alert for the communication device 108. The notification alert can be in form of a text message, a voice recording, an automated response system, or a Session Initiation Protocol (SIP) NOTIFY message and the like. For example, a text message containing the phone number of the caller 102 may be sent to the user of the communication device 108 when a call set-up request from the caller 102 for the communication device 108 is rejected.

Further, FIG. 1 shows only the caller 102, the communication server 104, the notification server 106, the communication device 108, and the communication device 110; however, in practical scenarios the communication network could include multiple callers, communication servers, notification servers and communication devices.

Figure 2:
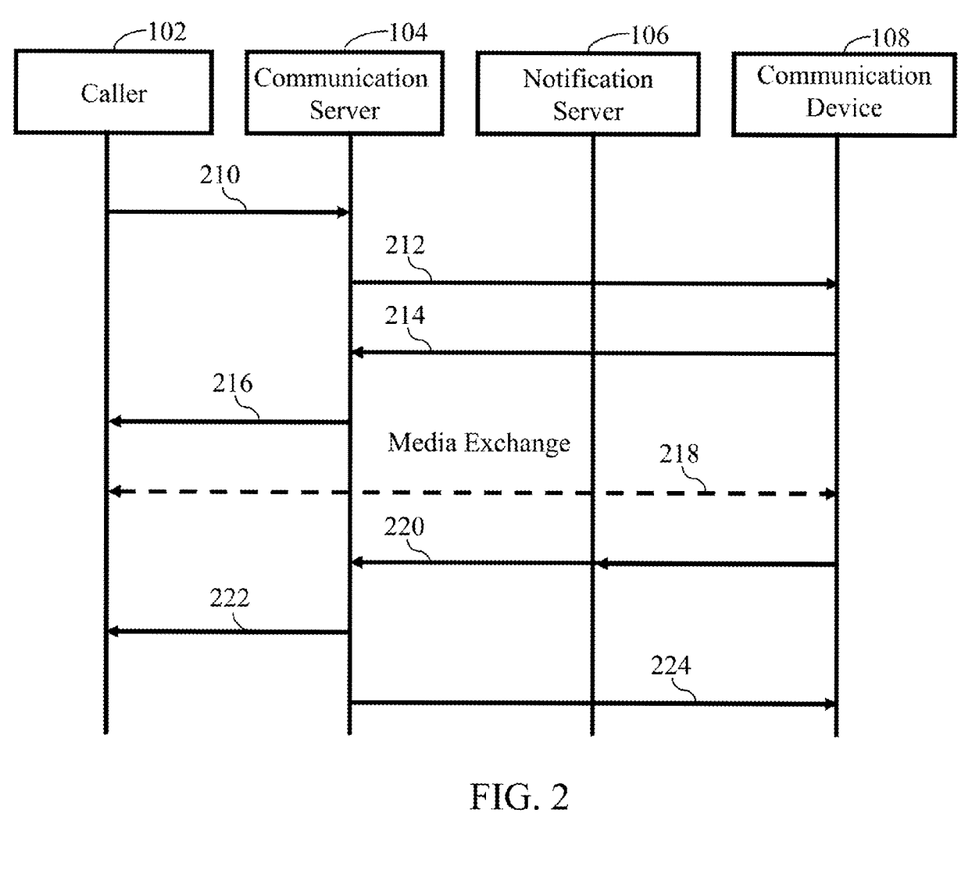
FIG. 2 illustrates a call flow diagram according to an embodiment of the present invention.

FIG. 2 illustrates a call flow diagram according to an embodiment of the present invention. The call flow diagram shows messages exchanged between the caller 102, the communication server 104, the notification server 106, and the communication device 108 in order to add the caller 102 to a blocked list. To describe the call flow, reference will be made to the FIG. 1, although it is understood that the call flow can be implemented in any other suitable environment or network.

The caller 102 requests the communication server 104 to set-up a call with communication device 108 by sending a call set-up request 210 to the communication server 104. The call set-up request 210 can include an identifier associated with the communication device 108. The identifier helps to uniquely identify the communication device 108 within the communication network 100. The identifier can be a phone number, a private address used within the communication network 100, a SIP URI, an Internet protocol (IP) address and the like. Based on the call set-up request 210, the communication server 104 sends a call set-up request message 212 to the communication device 108. The message 212 can include the call set-up request 210 and is intended to set-up the call between the caller 102 and the communication device 108. A user of the communication device 108 is alerted of the incoming call from the caller 102 based on the message 212. The user of the communication device 108 accepts the incoming call from the caller 102 by pressing a designated button on the communication device 108. In response to the pressing of the button, the communication device 108 sends a message 214 to the communication server 104 acknowledging answering of the incoming call from the caller 102. Thereafter, the communication server 104 forwards the acknowledgement received from the communication device 108 to the caller 102 by sending a message 216.

After the message 216 has been sent to the caller 102 by the communication server 104, the call is established. The caller 102 then can exchange data, such as voice data, with the user of the communication device 108 by sending a message 218. However, in some scenarios, the caller 102 may be a telemarketer, a harasser, a malicious caller or any other unwanted caller and the user of the communication device 108 would like not to receive any further calls from the caller 102. Further, the user of the communication device 108 would like to block the caller 102. For one embodiment, the user of the communication device 108 can transmit a call termination request 220 to the communication server 104 and the notification server 106 by pressing a designated key on the key pad of the communication device 108. In this embodiment, a set of instructions to block the caller 102 is transmitted along with the call termination request 220. The set of instructions can include a request for receiving notification alerts based on further call set-up requests received from the caller 102, a time period for blocking the caller 102, a condition for blocking the caller 102, and a reason for blocking the caller 102. For example, George (user of the communication device 108) after receiving a call from a telemarketer, John (caller 102), presses a key on the communication device 108 to block John and to terminate the call. In response to the pressing of the key, a call termination request can be transmitted to the communication server 104 and the notification server 106. In addition, in response to the pressing of the key, the communication device 108 may display on a display screen of the communication device text that prompts George for, or may display a form via which George can input, instructions to block John. When George further inputs instructions to block John, these instructions are transmitted to the communication server 104 along with, and preferably are included in, the call termination request. Based on the set of instructions received with the call termination request 220, the communication server 104 can add the caller 102 (John) in a blocked list. As a result of addition of the caller 102 to the blocked list, future calls from the caller 102 can be rejected. The blocked list can be stored and updated at the communication server 104.

For another embodiment, the call termination request 220 can include a set of instructions to store the voice of the caller 102. In this embodiment, voice of the caller 102 is pre-recorded at the communication server 104 after the media exchange is initiated by the message 218. The communication server 104 then may store the pre-recorded voice of the caller 102 in a particular format in a memory of the communication server 104 as per the set of instructions contained in the call termination request 220. For example, communication server 104 may convert John's voice sample to one of the various available formats such as Windows Wave (WAV), Moving Picture Experts Group Layer-3 Audio (MP3), Advanced Audio Coding (AAC), Audio Compression—3 (AC3), Apple Lossless Audio Codec (ALAC), Adaptive Multi-Rate AMR, Windows Media Audio (WMA) and the like. Further the communication server 104 may convert the recorded voice of the caller 102 into text by a voice-to-text conversion system included in, or coupled to, the communication server 104. Hence, the data associated with the voice of the caller can also be stored as a string of words or a piece of text.

After adding the caller 102 in the blocked list and/or recording the voice of the caller 102, the communication server 104 terminates the call by sending a termination message 222 to the caller 102. After terminating the call, the communication server 104 sends an acknowledgement message 224 to the communication device 108. The acknowledgement message 224 acknowledges blocking of the caller 102 or recording and storing of voice of the caller 102 to the user of the communication device 108. For example, George can receive a text message from the communication server 104, informing George about successfully blocking John.

Figure 3:
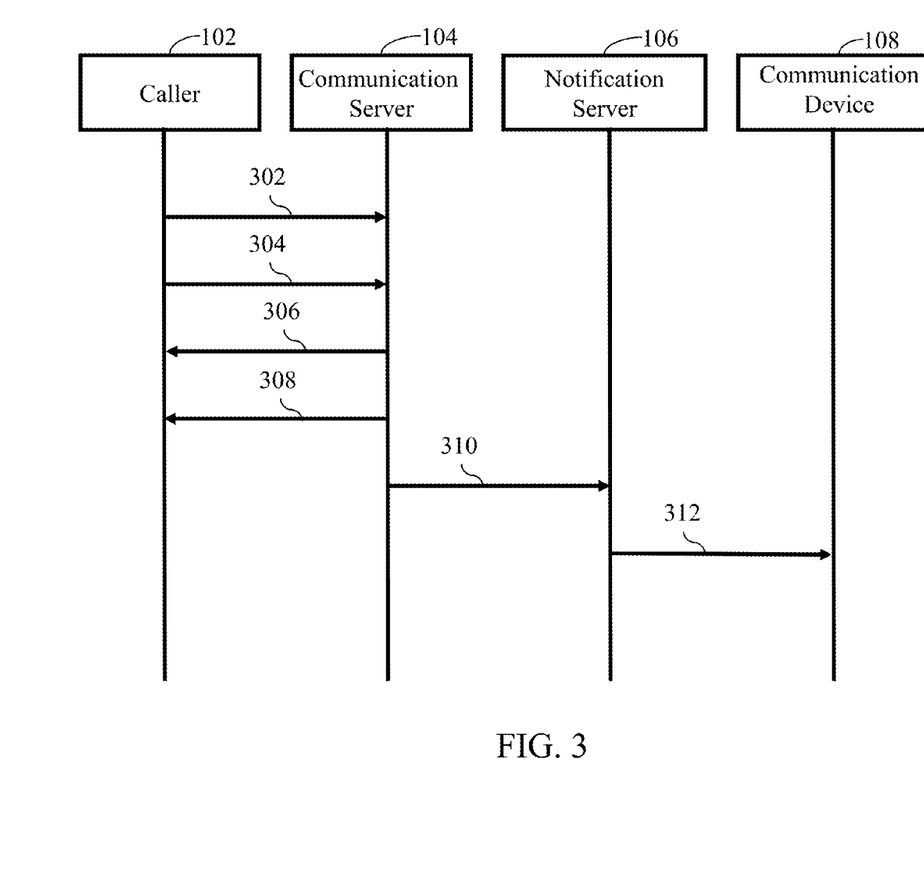
FIG. 3 illustrates a call flow diagram according to another embodiment of the present invention.

FIG. 3 illustrates a call flow diagram according to another embodiment of the present invention. The call flow diagram shows messages exchanged between the caller 102, the communication server 104, the notification server 106, and the communication device 108 in order to terminate the call from the caller 102. To describe the call flow, reference will be made to the FIG. 1 and FIG. 2, although it is understood that the call flow can be implemented in any other suitable environment or network.

The call flow diagram depicted in FIG. 3 begins when the caller 102 requests the communication server 104 to set-up a call with communication device 108 by sending a call set-up request 302 to the communication server 104. In a usual scenario, the caller 102 is checked against a white list maintained at the communication server 104. The white list contains a set of callers authorized by the communication device 108. In the event that the caller 102 is present in the white list, the call setup request 302 is forwarded to the communication device 108 for the purpose of establishing the call between the caller 102 and the communication device 108. However, in the current embodiment, if the caller 102 is, not present in the white list the call is established at the communication server 104 without forwarding the call set-up request 302 to the communication device 108. This is done in order to receive a voice signal 304 from the caller 102. The voice signal 304 is recorded at the communication server 104 after it is received from the caller 102. The communication server 104 then may convert the recorded voice signal 304 to a particular format in order to compare the voice signal 304 with a predefined data maintained in the memory of the server 104. The predefined data can be the data associated with another voice signal recorded and stored at an instance when a call was blocked.

Further, the communication server 104 also may convert the voice signal 304 into text by the voice-to-text conversion system.

In one embodiment, the predefined data can be a text converted from the voice of the caller 102 that has been previously recorded at the communication server 104. For example, suppose that John calls George for the first time and introduces himself to George by saying a specific line such as "Hi, I am calling from Exotic Sellers." George, being not interested in the offer, presses a key on the communication device 108 to terminate the call and to record John's voice for blocking all such future calls. John's voice, which has been recorded and then converted into text, can serve as the predefined data in this case. For another embodiment, the predefined data can be a voice message recorded by the user of the communication device 108 or a text message provided by the user of the communication device 108 to the communication server 104. For example, George can record "Hi, I am calling from Exotic Sellers" in his own voice. This voice recording can serve as the predefined data. Another example of the predefined data can be George entering the string of words "Exotic" and/or "Sellers" in a text message and sending it to the communication server 104.

After the voice-to-text conversion system of communication server 104 converts the data associated with the voice signal 304 to the particular format or to text, the communication server 104 compares the converted voice signal to the predefined data. If the data associated with the voice signal 304 received from the caller 102 is found comparable to the predefined data, that is, a match is determined in at least a limited way, for example, when a match is determined with respect to one or more key words of the converted voice signal and the predefined data, then a pre-recorded message 306 is transmitted to the caller 102. The pre-recorded message 306 is a message recorded by the user of the communication device 108 and that informs the caller 102 that the call is blocked. Further, a call termination message 308 is transmitted to the caller 102 after transmission of the pre-recorded message 306. For example, George can record a message at the communication server 104 saying "I have added your number to a blocked list and please don't bother calling again." This message will be replayed to every caller blocked by the communication server 104. As a result, when John calls George for a second time and introduces himself by using the same line, "Hi, I am calling from Exotic Sellers," the communication server 104 compares John's voice sample with the previously recorded voice sample and terminates the call. As another embodiment, the communication server could compare the text of what John spoke with the predefined text data. However, before terminating the call the communication server 104 will replay the message recorded by George to John.

After the call is terminated/rejected by the communication server 104, a message 310 is sent to the notification server 106. The message 310 includes an indication of rejection of the call/call set-up request by the communication server 104 and other information corresponding to the caller 102. The other information can be a phone number of the caller 102, identity/name of the caller 102 and the like. The indication of rejection of the call/call set-up request serves as a trigger for notification server 106 to generate a notification alert 312 for the communication device 108. The notification server 106 can utilize the other information contained in the message 310 to generate the notification alert 312. The notification alert 312 informs user of the communication device 108 regarding the termination of call by the communication server 104. For example, after John's call is blocked at the communication server 104, a text message may be sent to George from the notification server 106. The text message can include data such as a phone number of John, a time when the call was blocked, and a reason for blocking John. This text message can help George in keeping a log of calls blocked by him.

Figure 4:
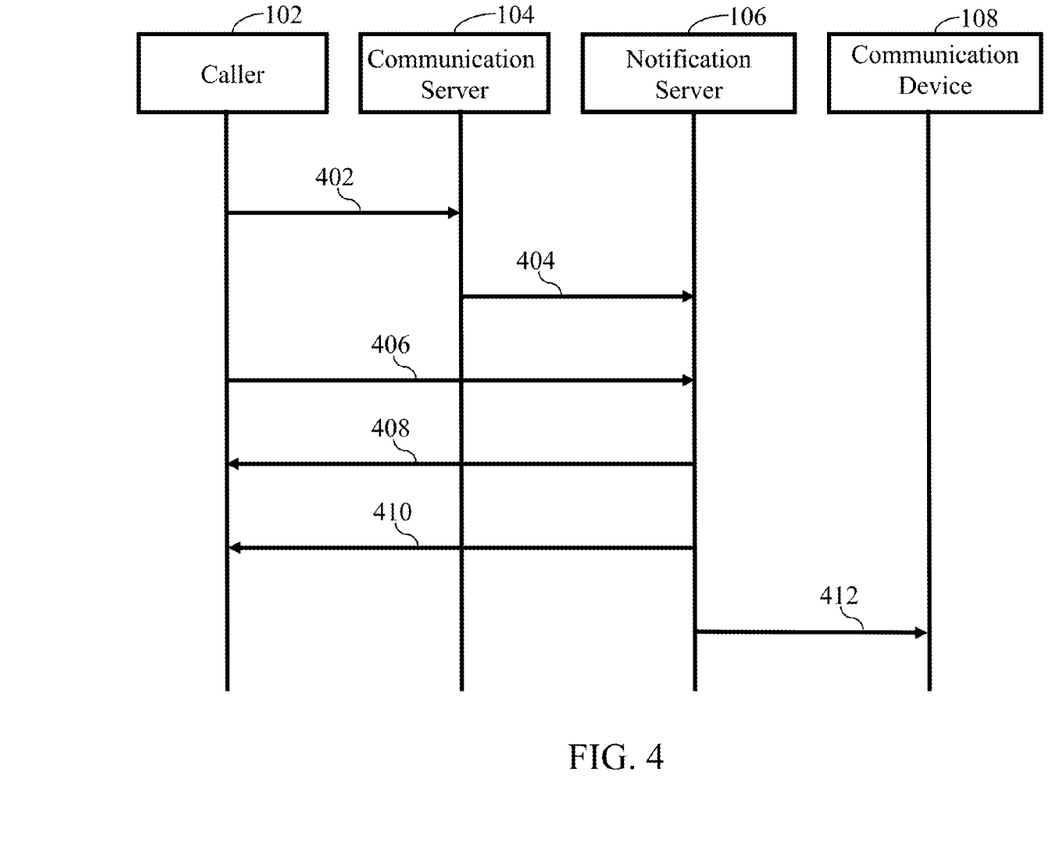
FIG. 4 illustrates a call flow diagram according to yet another embodiment of the present invention.

FIG. 4 illustrates a call flow diagram according to yet another embodiment of the present invention. The call flow diagram shows messages exchanged between the caller 102, the communication server 104, the notification server 106, and the communication device 108 in order to terminate the call from the caller 102. To describe the call flow, reference will be made to the FIG. 1 and FIG. 2 although it is understood that the call flow can be implemented in any other suitable environment or network.

The call flow diagram depicted in FIG. 4 begins when the caller 102 requests the communication server 104 to set-up a call with communication device 108 by sending a call set-up request 402 to the communication server 104. The caller 102 is checked against a white list maintained at the communication server 104. The white list contains a set of callers authorized by the communication device 108. If the caller 102 is present in the white list, the call setup request 302 is forwarded by the communication server 104 to the communication device 108 for the purpose of establishing the call. However, in the current embodiment, if the caller 102 is not present in the white list, the call set-up request 402 is forwarded by the communication server 104 to the notification server 106 by sending a message 404. In response to receiving the message 404 at the notification server 106, the call is established at the notification server without forwarding the call set-up request 402 to the communication device 108. This is done in order to receive a voice signal 406 from the caller 102. The voice signal 406 is recorded in a memory at the notification server 106 after it is received from the caller 102. The notification server 106 converts the voice signal 406 to a particular format and compares the converted voice signal with a predefined data. The particular format can be text, as the data associated with the voice signal 406 can be converted into text by the voice-to-text conversion system included in, or coupled to, the notification server 106.

In case the data associated with the voice signal 406 received from the caller 102 is found comparable to, that is, matches in at least a limited way, the predefined data, then the notification server 106 conveys a pre-recorded message 408 to the caller 102. The pre-recorded message 408 can be a message recorded by the user of the communication device 108 and informs the caller 102 that the call is being blocked. Further, the notification server 106 conveys a call termination message 410 to the caller 102 after transmission of the pre-recorded message 408. However, in case the data associated with the voice signal 406 is not comparable to the predefined data, the call between the caller 102 and the communication device 108 can be established.

After the termination/rejection of the call is indicated to the notification server 106, a notification alert 412 is generated by the notification server 106. The notification alert 412 can include information related to the phone number of the caller 102, identity/name of the caller 102, and the like. The notification alert 412 is transmitted to the communication device 108. The notification alert 412 informs the user of the communication device 108 regarding the call terminated by the notification server 106.

Figure 5:
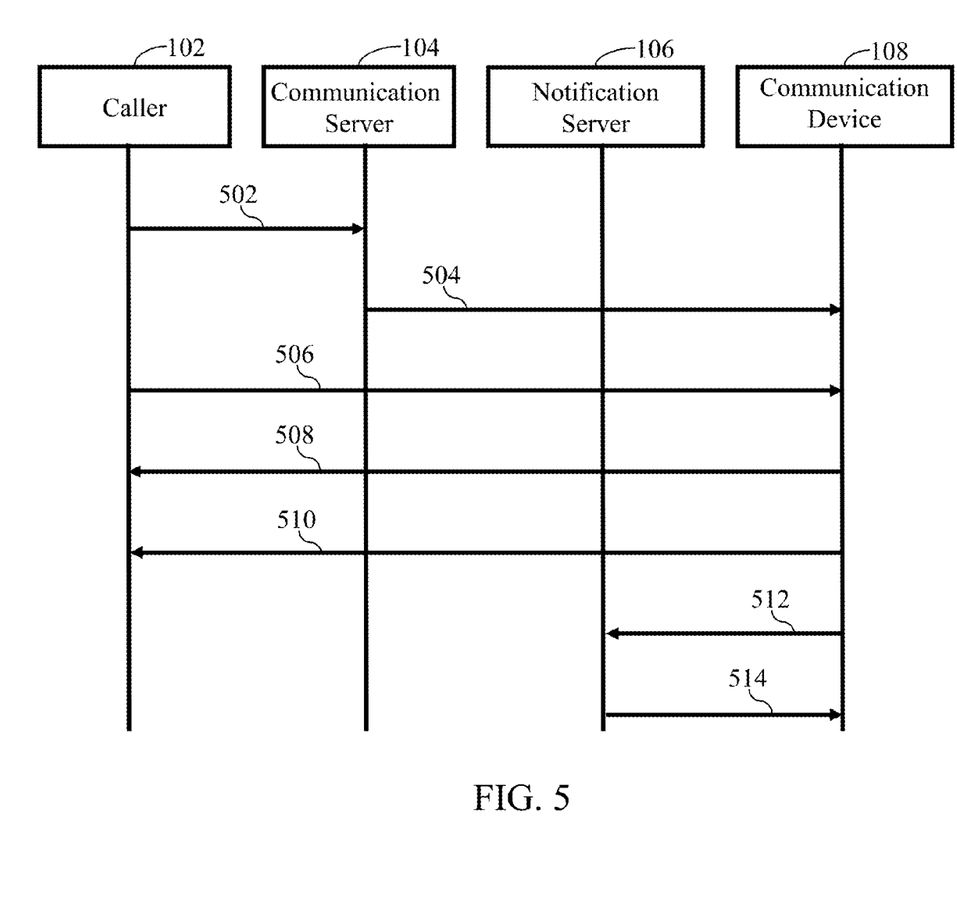
FIG. 5 illustrates a call flow diagram according to still another embodiment of the present invention.

FIG. 5 illustrates a call flow diagram according to yet another embodiment of the present invention. The call flow diagram shows messages exchanged between the caller 102, the communication server 104, the notification server 106, and the communication device 108 in order to terminate the call from the caller 102. To describe the call flow, reference will be made to the FIG. 1 and FIG. 2 although it is understood that the call flow can be implemented in any other suitable environment or network.

The call flow diagram depicted in FIG. 5 begins when the caller 102 requests the communication server 104 to set-up a call with communication device 108 by sending a call set-up request 502 to the communication server 104. In this embodiment, the call set-up request 502 is forwarded 504 by the communication server 104 to the communication device 108 for the purpose of establishing the call. Prior to the ringing of the communication device 108, the caller 102 is checked against a white list maintained at the communication device 108. The white list contains a set of callers authorized by the communication device 108. For example, a contact list of a mobile phone, in this case the communication device 108, can serve as the white list. If the caller 102 is present in the white list, the communication device 108 is rung to inform the user of the incoming call. The incoming call is established at the communication device 108 and a recording of a voice signal 506 is not initiated.

If the caller 102 is not present in the white list, the call is established at the communication device 108 and a pre-recorded voice message, such as "hello," is retrieved from a memory of the communication device 108. The communication device 108 then conveys the retrieved voice message to communication device 110, where the pre-recorded "hello" is replayed to the caller 102 to convince the caller that the call has been established with the user of communication device 108. The pre-recorded "hello" is replayed for the caller 102 without alerting the user of the communication device 108. In response to the establishment of the call and the playing of the pre-recorded voice message, a voice signal 506 is received by the communication device 108 from the caller 102. Communication device 108 then records the received voice signal 506 and stores it in the memory of communication device 108. The communication device 108 further converts the voice signal 506 to a particular format at the communication device 108 and compares the converted voice signal with a pre-defined data. The particular format can be text as the data associated with the voice signal 406 can be converted into text by a voice-to-text conversion system included in the communication device 108.

If the data associated with the voice signal 506 received from the caller 102 is found comparable to, that is, matches in at least a limited way, the predefined data, then the communication device 108 conveys a pre-recorded message 508 to the caller 102. The pre-recorded message 508 can be a message recorded by the user of the communication device 108 and informs that the caller 102 is being blocked. Further, the communication device 108 conveys a call termination message 510 to the caller 102 after transmission of the pre-recorded message 508. However, in case the data associated with the voice signal 506 is not comparable to the predefined data, the communication device 108 alerts the user of the communication device 108 to the call and the call between the caller 102 and the communication device 108 then can be established after the user of communication device 108 answers the call. The data associated with the voice signal 506 can be used as a predefined data for call setup requests at a later point of time.

After the call is terminated/rejected by the communication device 108, the communication device 108 conveys a message 512 to the notification server 106. The message 512 includes an indication of rejection of the call/call set-up request by the communication server 104 and other information corresponding to the caller 102. The other information can be a phone number of the caller 102, identity/name of the caller 102, and the like. The indication of rejection of the call/call set-up request serves as a trigger for notification server 106 to generate a notification alert 514 for the communication device 108. The notification server 106 can utilize the other information contained in the message 512 to generate the notification alert 514. In other embodiments of the present invention, the notification alert 514 can be sent by the notification server 106, or by the communication device 108, to another communication device as selected by the user of the communication device 108. This is advantageous in case the user of the communication device 108 wants to process the notification alert 514 or maintain a log of notification alerts at another communication device. The notification alert 514 informs the user of the communication device 108 regarding the termination of call by the communication device 108. For example, after the call is blocked at the communication device 108, a text message may be sent from the notification server 106. The text message can contain data such as the phone number of caller 102, a time when the call was blocked, and/or a reason for blocking the call. This text message helps a user in keeping a log of calls blocked by him or her.

Figure 6:
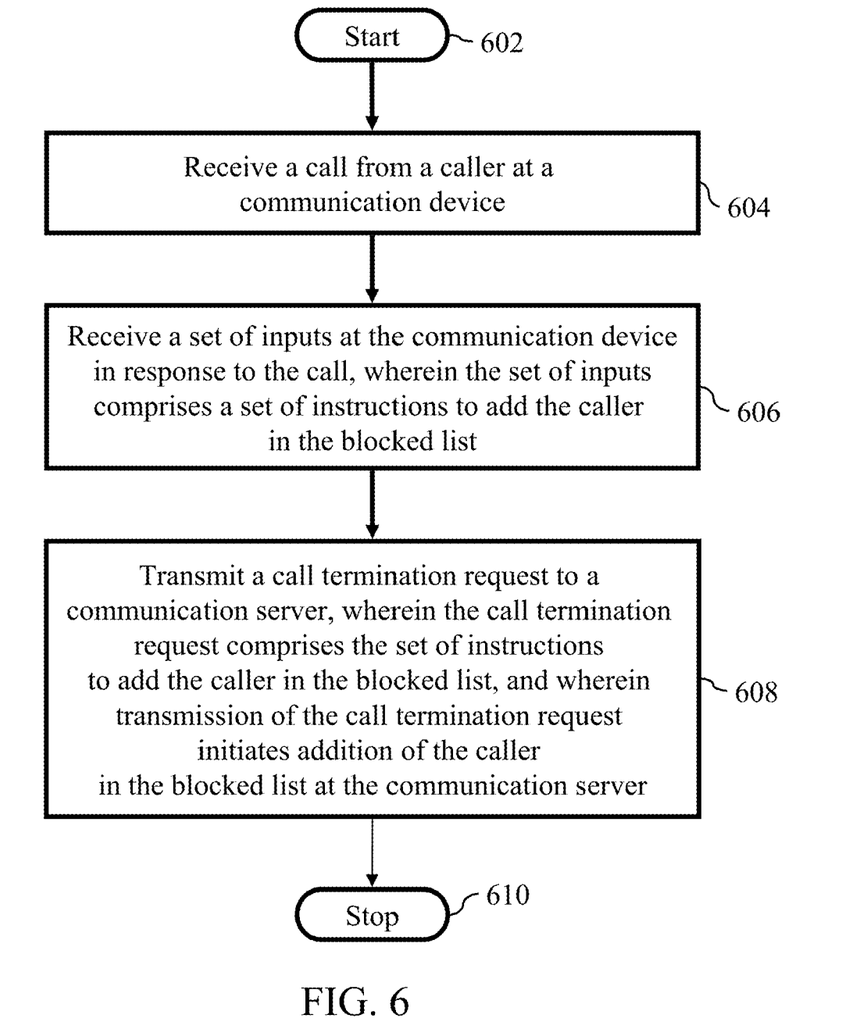
FIG. 6 is a flow diagram illustrating a method for adding a caller in a blocked list in accordance with some embodiments of the present invention.

FIG. 6 is a flow diagram illustrating a method for adding the caller 102 to a blocked list in accordance with various embodiments of the present invention. To describe the method, reference will be made to FIG. 1, although it is understood that the method can be implemented in any other suitable environment or network. Moreover, the invention is not limited to the order in which the steps are listed in the method.

The method for adding the caller 102 to a blocked list initiates at step 602. At step 604, a communication device, such as the communication device 108, receives a call from an unwanted caller, such as the caller 102, for example, a telemarketer. In case the caller 102 is an unwanted caller, the user of the communication device 108 responds by inputting to the communication device 108, for example, by pressing one or more buttons of the communication device 108, and the communication device receiving 606 from the user, a set of instructions. The set of instructions includes instructions to add the caller 102 to the blocked list. Further, at step 608, the user of the communication device 108 can transmit a call termination request to the communication server 104 in order to terminate the first call and to block future calls from the caller 102. The communication device 108 can also transmit the call termination request to the notification server 106. The call termination request includes the instructions to add the caller 102 to the blocked list. In response to receiving the call termination request, the communication server 104 initiates the addition of the caller 102 to the blocked list.

In one embodiment of the present invention, the call termination request is transmitted to the communication server 104 based on an input received at the communication device 108. The input can be a pressing of a key on a key pad of the communication device 108 by the user of the communication device 108. For example, George can push a pre-designated key on the communication device 108 after receiving a call from John and with an intention of terminating the call from John and further blocking any calls from John that are received within a predefined time period. In this embodiment, the time period for blocking the caller 102 can be a default period or a time period predefined by the user of the communication device 108.

In another embodiment of the present invention, the user of the communication device 108 can provide a set of inputs at the communication device 108 in order to terminate the call and to provide a set of instructions to block the caller 102. In this embodiment, the user of the communication device 108 can select options for receiving notification alerts from the notification server 106 every time a call from the caller 102 is rejected/terminated. Further, the user of the communication device 108 can select a time period for which the user wants the caller 102 to be blocked, a condition for blocking the caller 102, and a reason for blocking the caller 102. All these options selected by the user of the communication device 108 can be transmitted by the communication device 108 to the communication server 104 and the notification server 106 in form of the set of instructions included in the call termination message.

Based on the set of instructions included in the call termination message, communication server 104 adds the caller 102 to the blocked list at step 608. The communication server 104 updates the blocked list and stores the set of instructions in the memory of the communication server. For example, after receiving a call from an unwanted caller, George can punch a key on the communication device 108 to block the unwanted caller. As a result, a database on the communication server 104 can dynamically store the phone number and other details associated with the unwanted caller. After the caller 102 is added to the blocked list, the call is terminated by the communication server 104. Further, based on addition of the caller 102 to the blocked list, an acknowledgement message can be transmitted to the communication device 108.

When the communication server 104 receives another call set-up request from the caller 102 after the caller 102 has been added to the blocked list, the communication server 104 rejects the call set-up request. In addition, the notification server 106, working in conjunction with the communication server 104, may transmit a notification alert to the communication device 108. Thereafter, the method terminates at step 610.

Figure 7:
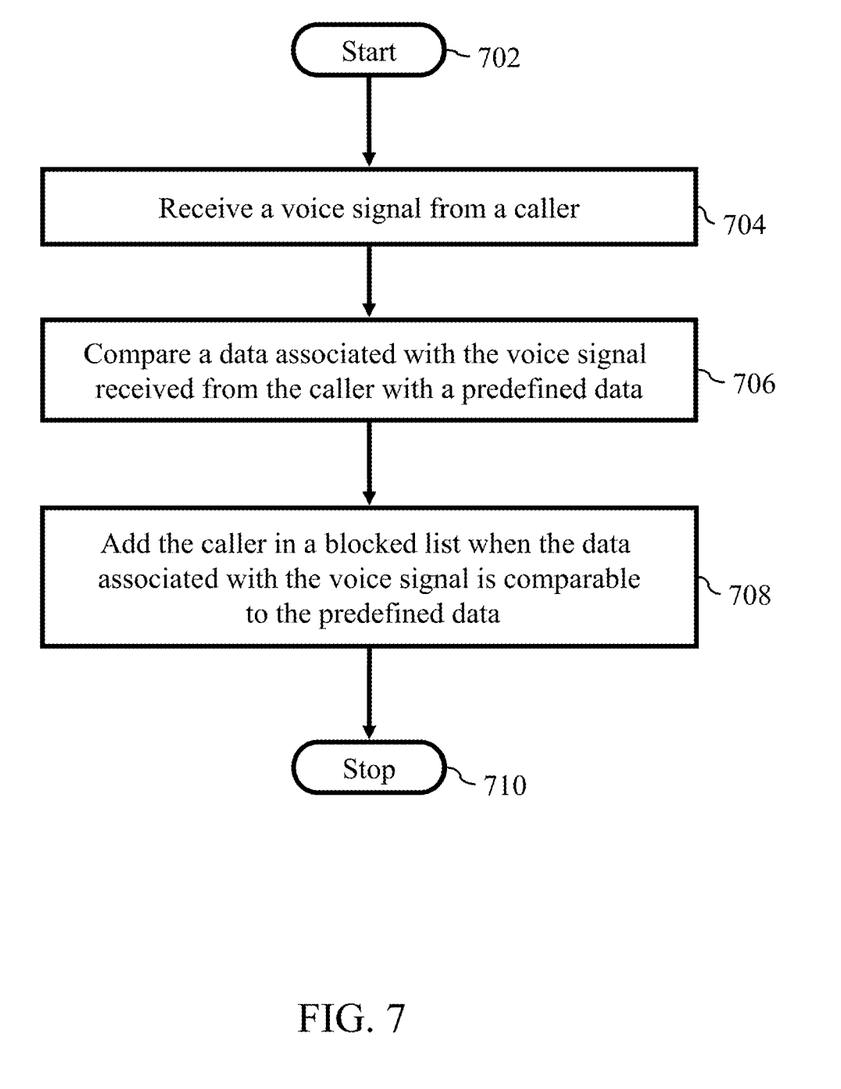
FIG. 7 is a flow diagram illustrating a method for adding a caller in a blocked list in accordance with various embodiments of the present invention.

FIG. 7 is a flow diagram illustrating a method for adding the caller 102 in a blocked list in accordance with various embodiments of the present invention. To describe the method, reference will be made to FIG. 1, although it is understood that the method can be implemented in any other suitable environment or network. For example, the method as described below can be implemented at the communication server 104 or at the communication device 108. Moreover, the invention is not limited to the order in which the steps are listed in the method.

The method for adding the caller 102 in a blocked list initiates at step 702. At step 704, a voice signal is received from the caller 102. The voice signal can be received at the communication server 104. At step 706, the communication server 104 compares a data associated with the voice signal from the caller 102 with a predefined data. In one embodiment, the predefined data can be the voice of the caller 102 previously recorded at the communication server 104. The predefined data in this case is recorded based on an input received at the communication device 108. For example, when the caller 102, for example, John, calls a user of the communication device 108, for example, George, for the first time, John may introduce himself to George by saying a specific line such as "Hi, I am calling from Exotic Sellers." George, being not interested in the offer, presses a key on the communication device 108. The pressing of the key terminates the call and also initiates a storing of John's voice at one or both of the communication server 104 and the communication device 108. John's stored voice then may server as the predefined data. In another embodiment, the predefined data can be the recorded voice of the caller 102 converted into text by a voice-to-text conversion system included in, or associated with, one or more of the communication server 104 and the communication device 108 and stored in the memory of the communication server and/or the communication device as a string of words or a piece of text.

When the predefined data is stored at the communication server 104, the predefined data may be stored at the communication server 104 by the user of the communication device 108. In such an embodiment, the user can record a voice message on the communication server 104 or can store a text file at the communication server 104. The voice message recorded by the user or the text file stored by the user then may become the predefined data. In the event that the data associated with the voice signal received from the caller 102 is not similar to the format of the predefined data, then the data associated with the received voice signal is converted to the format of the predefined data to allow for a comparison with the predefined data. Further, the received voice signal can also be converted into text using the voice-to-text conversion system. Thus the data from the voice of a caller blocked earlier can be in form of a text. The stored voice data from an earlier blocked caller then can be compared to text that has been currently converted from the voice of a current caller. This method of converting voice signals to text ensures that any changes in voice patterns will not affect the result of comparison between the data associated with the voice of the current caller with the voice of the caller blocked earlier.

Based on the comparison between the data associated with the voice signal with the predefined data at step 706, the communication server 104 can determine that caller 102 is an unwanted caller and can add the caller 102 to the blocked list at step 708. In addition, based on the comparison, the communication server 104 may reject the call and, further, may convey a pre-recorded message to the caller 102 before termination of the call. After the pre-recorded message is transmitted to caller 102, the method is terminated at step 710.

Figure 8:
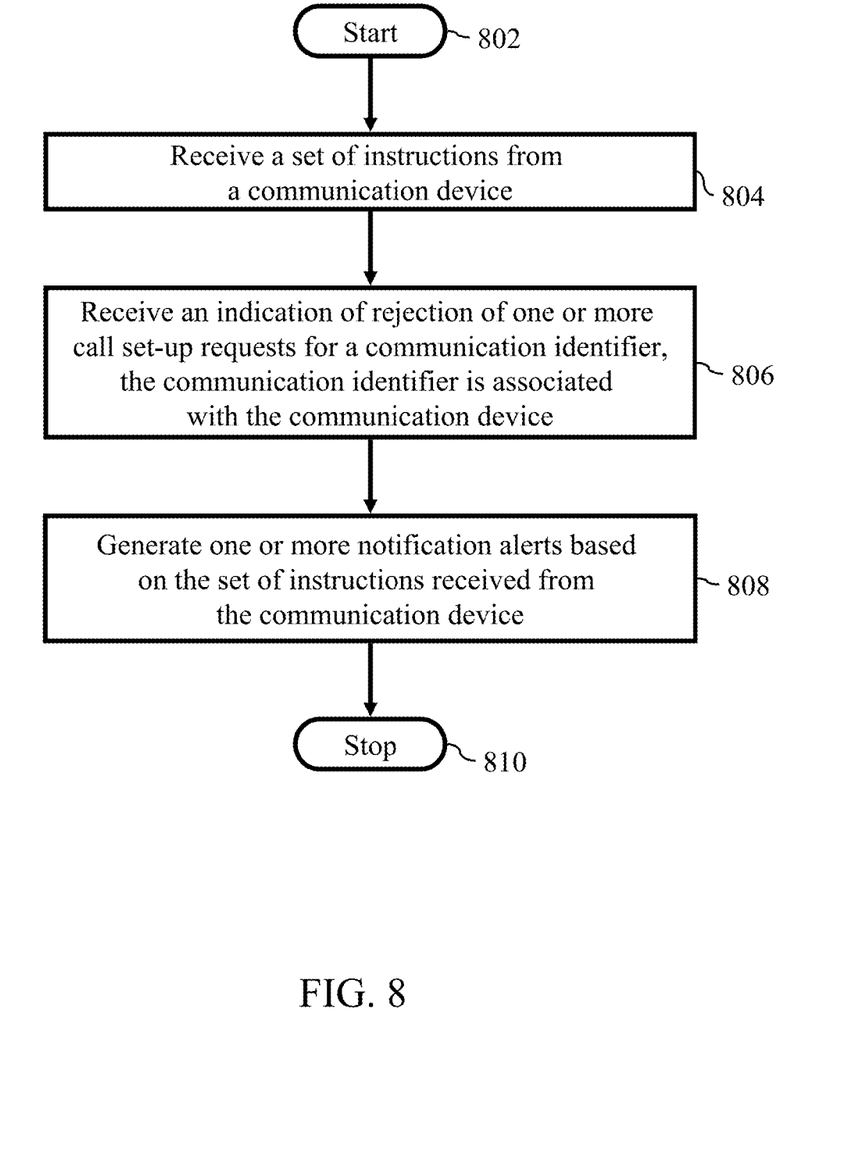
FIG. 8 illustrates a flow diagram for a method for generating one or more notification alerts for a communication identifier based on rejection of one or more call set-up requests for the communication identifier in accordance with various embodiments of the present invention.

FIG. 8 illustrates a flow diagram for a method for generating one or more notification alerts for a communication identifier based on rejection of one or more call set-up requests for the communication identifier in accordance with various embodiments of the present invention. To describe the method, reference will be made to FIGS. 1, 3, and 4 although it is understood that the method can be implemented in any other suitable environment or network. Moreover, the invention is not limited to the order in which the steps are listed in the method.

The communication identifier is associated with the communication device 108 and can be a phone number, a private address used within a communication network, an Internet protocol (IP) address, and the like. The method for generating notification alerts for a communication identifier based on rejection of call set-up requests for the communication identifier initiates at step 802. At step 804, the notification server 106 receives a set of instructions related to the communication identifier from the communication device 108. The set of instructions can be included in a call termination request received from the communication device 108. The set of instruction received from the communication device 108 includes a request for receiving of notification alerts from the notification server 106. Further, the set of instructions transmitted by the communication device 108 may be based on an input or a set of inputs received at the communication device 108 from a user of the communication device.

At step 806, an indication of rejection of a call set-up request for the communication identifier is received. In one embodiment of the present invention, as discussed herein with respect to FIG. 3, the call set-up request can be rejected by the communication server 104. The communication server 104 then may convey an indication of rejection of the call set-up request to the notification server 106. That is, in such an embodiment, when the communication server 104 receives a call set-up request from caller 102 and wherein the callee is communication device 108, the communication server does not forward the call set-up request and the call set-up request is rejected at the communication server. The communication server 104 then indicates, to the notification server 106, that the call set-up request is being rejected. Based on the received indication of rejection of the call set-up request, the notification server 106 generates a notification alert at step 808. The notification alert can be in form of a text message or a SIP NOTIFY including the details of the blocked caller 102, the time of blocking the call, the reason for blocking the call, and other related information. The notification server 106 then conveys the notification alert to the communication device 108.

In another embodiment of the present invention, the call set-up request can be rejected by the notification server 106. In such an embodiment, as discussed herein with respect to FIG. 4, when the communication server 104 receives a call set-up request from caller 102 wherein the callee is communication device 108, the communication server forwards the call set-up request to the notification server 106. The call then is established at the notification server 106 without forwarding the call set-up request to the communication device 108. This is done in order to receive a voice signal from the caller 102 the notification server 106. After receiving the voice signal from the caller 102, the notification server 106 compares the data associated with the voice signal with a predefined data stored at the notification server. The notification server 106 stores the predefined data based on the set of instructions received from the communication device 108 prior to the receipt of the current call set-up request. For example, the caller 102 (John) may call the user of communication device 108 (George) for the first time and introduce himself to George by saying a specific line, such as "Hi, I am calling from Exotic Sellers." George, being not interested in the offer, presses a key on the communication device 108 to terminate the call and to record John's voice for blocking all such future calls. Thereafter, John's recorded voice would serve as predefined data. The predefined data can also be a voice message recorded by the user of the communication device 108 or a text message provided by the user of the communication device 108 to the notification server 106.

When the data associated with the voice signal of the caller 102 and the predefined data are similar, the notification server 106 adds the caller 102 to a blocked list. In addition, the notification server 106 may convey a pre-recorded message, maintained in the memory of the notification server, to the caller 102. The pre-recorded message can be a message previously recorded by the user of the communication device 108 and informs the caller 102 that the call is being blocked. After transmission of the pre-recorded message to the caller 102, the call can be rejected by the notification server 106. After the termination/rejection of the call is indicated to the notification server 106 at step 806, the notification server 106 generates a notification alert at step 808 and conveys the notification alert to the communication device 108. The method then is terminated at step 810.

Figure 9:
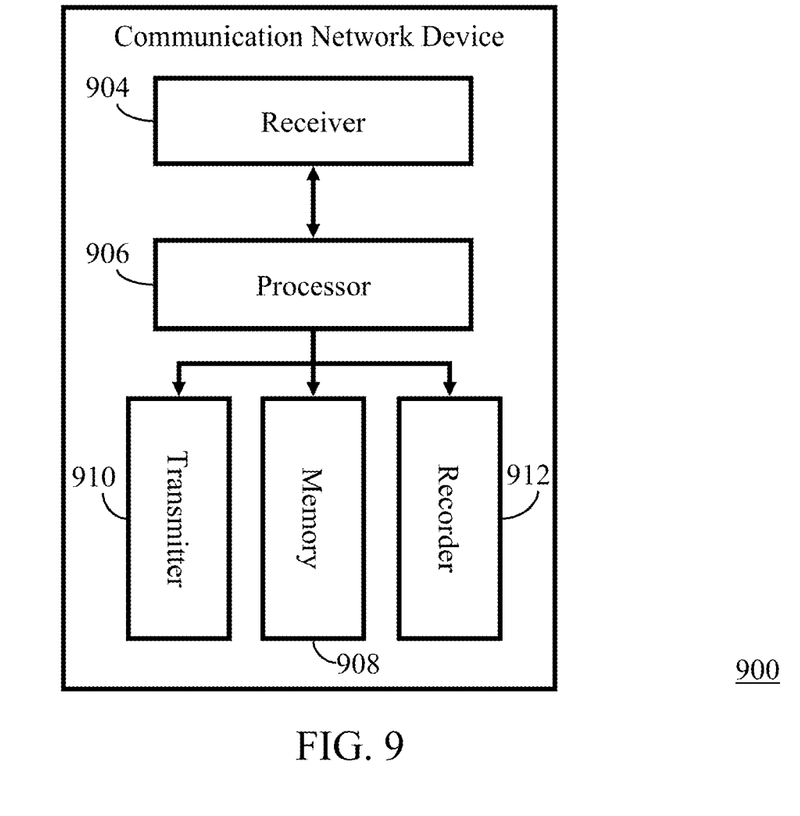
FIG. 9 is a block diagram of a communication network device in accordance with an embodiment of the present invention.

FIG. 9 is a block diagram of a communication network device 902 in accordance with an embodiment of the present invention. Those skilled in the art will appreciate that the communication network device 902 may include all or even a fewer number of components than the components shown in FIG. 9. Further, those ordinarily skilled in the art would understand that the communication network device 902 may include additional components that are not shown here and are not germane to the operation of the communication network device 902, in accordance with the inventive arrangements. To describe the communication network device 902, reference will be made to FIG. 1 and FIG. 4, but it should be understood that the communication network device 902 can be implemented in any other suitable environment or network. Further, in the light of the method as described in various figures above, the communication network device 902 can be represented by any one of the communication server 104, the communication device 108, or the notification server 106, when part of the communication network as shown in FIG. 1. Moreover, the communication network device 902 represented by the notification server 106 can be a SIP notification server. Similarly, an example of the communication network device 902 represented by the communication device 108 can be a mobile phone.

The communication network device 902 includes a receiver 904, a processor 906, a memory 908, a transmitter 910, and a recorder 912. The receiver 904 is configured to receive a voice signal from another communication device, such as the communication devices 110 and 108. The receiver 904 further may be configured to receive a set of instructions from another communication device, for example, the communication device 108. The set of instructions can be included in a call termination request received from the communication device 108 by the receiver 904, which communication device 108 may transmit the set of instructions based on a set of inputs received at the communication device 108. The communication device 108 is associated with a communication identifier. The communication identifier uniquely identifies the communication device 108. The communication identifier can be a phone number allocated to the communication device 108.

The receiver 904 further may be configured to receive an indication of rejection of call set-up requests for the communication identifier, wherein the communication identifier is associated with the callee of the call set-up requests. For example, the call set-up requests may comprise a communication identifier that identifies communication device 108 as the callee and may be sent by the caller 102. In one such embodiment, the indication of rejection can be received from the communication server 104. In this embodiment, after the indication of rejection of the call set-up requests is received by the receiver 904, the processor 906 can generate the notification alerts based on the set of instructions received from the communication device 108. In another embodiment, the indication of rejection can be received from the communication device 108. In this embodiment, after the indication of rejection of the call set-up requests is received by the receiver 904, the processor 906 can generate the notification alerts based on the set of instructions received from the communication device 108.

However, in yet another embodiment, the indication of rejection can be received by the receiver 904 from the processor 906. In this embodiment, the notification server 106 acts as the communication network device 902 and the call set-up request(s) is processed at the communication network device 902 after being forwarded to the communication network device 902 by the communication server 104. Based on processing of the call set-up request, the call with the caller 102 is established at the communication network device 902 and a voice signal from the caller 102 is received by receiver 904. The processor 906 converts, or arranges for the conversion of, the voice signal to a particular format. Further, the processor 906 compares a data associated with the voice signal with a predefined data. The predefined data can be recorded by a recorder 912, converted to the particular format by the processor 906, and stored in the memory 908 based on the set of instructions received from the communication device 108 prior to the currently received call set-up request. In case the data associated with the voice signal of the caller 102 and the predefined data are similar, the caller 102 is added, by the processor 906, to a blocked list maintained in the memory 908. Further, the process of adding the caller 102 to the blocked list is followed by rejection of the call by the processor 906.

The memory 908 further may maintain one or more pre-recorded messages. One such pre-recorded message may reject a call intended for the communication identifier/callee identified in a call set-up request and may be sent to a caller, such as the caller 102, by the transmitter 910. The pre-recorded message is sent before the processor 906 rejects the call for the communication identifier. The pre-recorded message can be recorded at the communication network device 902 by a user of a called communication device, such as communication device 108, using the recorder 912. After terminating the call with the caller, that is, the caller 102, the processor 906 generates a notification alert for the called communication device, that is, the communication device 108. The notification alert may be sent in response to receiving, from the called communication device, a request to receive the notification alert(s). The request to receive the notification alert(s) may be included in a set of instructions received by the receiver 904 from the communication device 108. The processor 906 then may convey the notification alert to the communication device 108 via the transmitter 910.

Various embodiments, as described above, provide a method and system for adding a caller in a blocked list. The present invention provides the users (subscribers) with the capabilities of dynamically blocking of unwanted calls. The users can block unwanted calls either after receiving an unwanted call or before receiving an unwanted call. Also, the method and system provides a facility of notification alerts. The notification alerts are issued whenever an unwanted call is blocked at the server level. Further, the notification alerts ensure that the user can keep a track of types and number of calls being blocked by the user.

In the foregoing specification, the invention and its benefits and advantages have been described with reference to specific embodiments. However, one with ordinary skill in the art would appreciate that various modifications and changes can be made without departing from the scope of the present invention, as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage or solution to occur or become more pronounced are not to be construed as critical, required or essential features or elements of any or all the claims. The invention is defined solely by the appended claims, including any amendments made during the pendency of this application, and all equivalents of those claims, as issued.

It will be appreciated that embodiments of the invention described herein may be comprised of one or more conventional processors and unique stored program instructions that control the one or more processors to implement, in conjunction with certain non-processor circuits, some, most, or all of the functions of the embodiments of the invention described herein. The non-processor circuits may include, but are not limited to, a radio receiver, a radio transmitter, signal drivers, clock circuits, power source circuits, and user input devices. As such, these functions may be interpreted as steps of a method for adding a caller in a blocked list. Alternatively, some or all functions could be implemented by a state machine that has no stored program instructions, or in one or more application specific integrated circuits (ASICs), in which each function or some combinations of certain of the functions are implemented as custom logic. Of course, a combination of these approaches could be used. Thus, methods and means for these functions have been described herein. In those situations for which functions of the embodiments of the invention can be implemented using a processor and stored program instructions, it will be appreciated that one means for implementing such functions is the media that stores the stored program instructions, be it magnetic storage or a signal conveying a file. Further, it is expected that one of ordinary skill, notwithstanding possibly significant effort and many design choices motivated by, for example, available time, current technology, and economic considerations, when guided by the concepts and principles disclosed herein will be readily capable of generating such stored program instructions and ICs with minimal experimentation.

What is claimed is:

1. A method for adding a caller to a blocked list, the method comprising:
    receiving a voice signal from the caller;
    comparing, in response to receiving of the voice signal, a voice data associated with the voice signal received from the caller with a predefined data by converting the voice data associated with the voice signal to a particular format and comparing the particular format of the voice data associated with the voice signal with the predefined data, wherein the predefined data is in the particular format; and
    based on the comparison, adding the caller to the blocked list when the voice data associated with the voice signal is comparable to the predefined data.

2. A communication network device comprising:
    a receiver configured to receive a voice signal from a caller;
    a memory that stores predefined data; and
    a processor configured to:
        compare, in response to receiving of the voice signal, a voice data associated with the voice signal received from the caller with the predefined data;
        convert the voice data associated with the voice signal to a particular format;
        compare the particular format of the voice data associated with the voice signal with the predefined data, wherein the predefined data is in the particular format; and
        based on the comparison, add the caller in a blocked list when the voice data associated with the voice signal is comparable to the predefined data.

3. The communication network device as recited in claim 2, wherein the processor is further configured to reject one or more call set-up requests from the caller.

4. The communication network device as recited in claim 2 further comprising a recorder configured to record the predefined data, wherein the predefined data is a voice data.

* * * * *